US008201081B2

(12) United States Patent
Stroe et al.

(10) Patent No.: US 8,201,081 B2
(45) Date of Patent: Jun. 12, 2012

(54) SYSTEMS AND METHODS FOR PROCESSING INOPERATIVE DOCUMENT LINKS

(75) Inventors: Mihai Stroe, Zurich (CH); Radu Berinde, Cambridge, MA (US)

(73) Assignee: Google Inc., Mountain View, CA (US)

( * ) Notice: Subject to any disclaimer, the term of this patent is extended or adjusted under 35 U.S.C. 154(b) by 1055 days.

(21) Appl. No.: 11/852,197

(22) Filed: Sep. 7, 2007

(65) Prior Publication Data
US 2009/0070306 A1    Mar. 12, 2009

(51) Int. Cl.
G06F 17/00 (2006.01)
(52) U.S. Cl. ......................... 715/234; 715/200
(58) Field of Classification Search .................. 715/234, 715/200, 206
See application file for complete search history.

(56) References Cited

U.S. PATENT DOCUMENTS

| 5,920,859 | A  | * | 7/1999  | Li ................................. 715/205 |
| 6,009,459 | A  | * | 12/1999 | Belfiore et al. ................ 709/203 |
| 6,092,100 | A  | * | 7/2000  | Berstis et al. ................. 709/203 |
| 6,385,642 | B1 | * | 5/2002  | Chlan et al. ................... 709/203 |
| 7,031,961 | B2 | * | 4/2006  | Pitkow et al. ......................... 1/1 |
| 7,437,364 | B1 | * | 10/2008 | Fredricksen et al. ................. 1/1 |
| 7,747,612 | B2 | * | 6/2010  | Thun et al. .................... 707/722 |
| 7,853,719 | B1 | * | 12/2010 | Cao et al. ....................... 709/245 |
| 7,966,310 | B2 | * | 6/2011  | Sullivan et al. ............... 707/709 |
| 2003/0204501 | A1 | * | 10/2003 | Moon .............................. 707/3 |
| 2004/0019697 | A1 | * | 1/2004  | Rose ............................. 709/245 |
| 2006/0031205 | A1 | * | 2/2006  | Perkins et al. ..................... 707/3 |
| 2008/0140647 | A1 | * | 6/2008  | Bailey et al. ...................... 707/5 |
| 2008/0320167 | A1 | * | 12/2008 | Collignon ..................... 709/245 |

OTHER PUBLICATIONS

Gilleland, M., et al., "Levenshtein Distance, in Three Flavors," http://www.merriampark.com/ld.htm, printed May 3, 2007, 12 pages.
Hollenback, S., et al., "Domain Name System Wildcards in Top-Level Domain Zones," VeriSign Inc., Sep. 9, 2003, 11 pages.
VeriSign Inc., "VeriSign's Site Finder Implementation," Aug. 27, 2003, 8 pages.

* cited by examiner

*Primary Examiner* — Manglesh M Patel
(74) *Attorney, Agent, or Firm* — Morgan, Lewis & Bockius LLP

(57) ABSTRACT

A server computer performs multiple operations in response to a user-identified inoperative document link. The server computer extracts one or more query terms from the user-identified document link. At least one of the query terms is different from the user-identified document link. The server computer searches a set of operative document links for one or more candidate document links in accordance with the user-identified document link. The server computer queries a cached document server for a document link to a cached copy of a document corresponding to the user-identified document link. The server computer returns at least one of the extracted query terms, the candidate document links, and the document link to the cached copy to the client computer.

29 Claims, 17 Drawing Sheets

SYSTEMS AND METHODS FOR PROCESSING INOPERATIVE DOCUMENT LINKS

FIELD OF THE INVENTION

The present invention relates generally to the field of a client-server computer network system, in particular to systems and methods of processing inoperative document links.

BACKGROUND OF THE INVENTION

Uniform Resource Locator (URL) is commonly used by a web browser to reference a document at a remote web server. To retrieve the document, a user can either enter the document's URL into an address field of the web browser or mouse-click the URL if it is embedded in another web page. Alternatively, the user can also retrieve the document by entering the URL as a query term into the search box of a search engine. These approaches all work as long as the URL is spelled correctly and the corresponding document is available at the location specified by the URL.

On the other hand, people often encounter inoperative URLs on the Internet. There are many possible causes behind an inoperative URL. It may happen if a user enters a misspelled URL into the address field of the web browser. It also occurs if the misspelled URL is embedded in a web page and the user selects (e.g., mouse-clicks) the URL. Sometimes, an inoperative URL occurs if the document referenced by the URL no longer exists at the URL-specified location (e.g., the document has been moved to a different location) or the web server hosting the document is temporarily or permanently shut down.

Conventionally, after determining that a user-identified URL is inoperative, the web browser displays either a generic error message web page or an error message web page customized by the web server receiving the URL. These error message web pages offer little help if the user does not know how to correct a misspelled URL or if the document referenced by the URL has been relocated. Furthermore, submitting the inoperative URL to a search engine rarely returns useful suggestions, perhaps because the inoperative URL is processed as a regular single-word query term.

In view of the aforementioned, it would be desirable to have a web browser capable of serving relevant information to a user when it encounters an inoperative document link. Further, it would be desirable for a web server to have similar functionalities when receiving an inoperative document link. Finally, when a cached copy of the document referenced by the inoperative document link exists, it would be desirable for a client device to receive, or be offered the opportunity to receive, the cached copy of the document.

SUMMARY

In some embodiments, a client application at a client computer with a screen display receives a user-identified document link. After determining that the document link is inoperative, the client application submits the document link to a document link server and receives multiple information items from the document link server. The information items include one or more user-editable query terms extracted from the user-identified document link and one or more candidate document links, at least one candidate document link referencing a document that is available at a remote storage device. The client application displays at least a subset of the information items on the screen display, e.g., by displaying one or more user-editable query terms in a search box and one or more candidate document links. In some embodiments, the client application also displays a link to a cached document that is a cached copy of a document corresponding to the user-identified document link.

In some embodiments, a document-hosting server computer receives a user-identified document link from a client computer, the user-identified document link including an identifier of the server computer. After determining that the user-identified document link is inoperative, the server computer submits the document link to a document link server and receives, in return, multiple information items from the document link server. The received information items include one or more query terms extracted from and different from the user-identified document link and one or more candidate document links, at least one candidate document link referencing a document that is available at a storage device that is remote from the client computer. The server computer returns at least a subset of the information items to the client computer. In some embodiments, the returned information items include one or more query terms to be displayed in a search box and one or more candidate document links. In some embodiments, the returned information further also includes a document link to a cached document that is a cached copy of a document corresponding to the user-identified document link.

In some embodiments, a server computer has access to a set of operative document links, at least one operative document link referencing a document that is available at a remote storage device. In response to a user-identified document link from a client computer, the server computer extracts one or more query terms from the user-identified document link. At least one of the extracted query terms is different from the user-identified document link. The server computer also searches the set of operative document links for one or more candidate document links in accordance with the user-identified document link. The server computer then returns the extracted query terms and the candidate document links to the client computer. In some embodiments, the server computer queries a cached document server for a document link to a cached copy of a document corresponding to the user-identified document link. If found, the document link to the cached copy is also returned to the client computer.

In some embodiments, a server computer has access to a set of operative document links, at least one operative document link having an associated quality value. In response to a user-identified document link received from a requesting device, the server computer searches the set of operative document links for one or more candidate complete document links in accordance with the user-identified document link and one or more quality values associated with the candidate complete document links. Additionally, the server computer searches the plurality of operative document links for one or more candidate approximate document links in accordance with the user-identified document link and one or more quality values associated with the candidate approximate document links. From the candidate complete document links and the candidate approximate document links, the server computer selects a subset such that at least one member document link in the subset has an associated quality value above a predefined threshold level. In some embodiments, the server computer queries a cached document server for a link to a cached copy of a document corresponding to the user-identified document link.

Some embodiments may be implemented on either a client or a server of a client-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

For convenience, several terms are defined herein to help understanding of the present application. These terms are used extensively to illustrate the invention in the rest of this specification.

A document link is a reference to a document that is at a remote or local location specified by the link. A web page and a link to the web page (e.g., the URL of the web page) are an exemplary document and a corresponding document link. But the present invention is applicable to other types of documents and document links. In the present document, URLs and documents links are considered to be synonymous. However, it is noted that in other contexts a link is sometimes defined to be a data structure that contains a URL or other location identifier.

A document link is inoperative if there is no document at the location specified by the document link. As noted above, a document link may be inoperative for a number of different reasons. In contrast, a document link is operative if a document is available at the location corresponding to the document link. Thus, a user can retrieve the document from the location, for example by selecting or activating the document link, or by entering the URL of the document link into the address field of a web browser.

A candidate document link is an operative document link that is deemed to be relevant to an inoperative document link. For example, the URL www.goog is an inoperative and incomplete document link. In some embodiments, there are three types of candidate document links that may correspond to an inoperative document link: a candidate complete document link (e.g., www.google.com), one or more candidate approximate document links (e.g., www.google.com/maps and www.google.com/mars), and one or more candidate support document links (e.g., www.google.com/sitemap.html). In some embodiments, candidate support document links are links that provide overview information about a website, e.g., the homepage URL and the sitemap URL for the website.

An invalid document link is an operative document link that, although relevant to an inoperative document link according to some embodiments of the invention, should not be served to a requesting client if the invalid document link's owner chooses not to do so or due to security, privacy, or other reasons.

Figure 1:
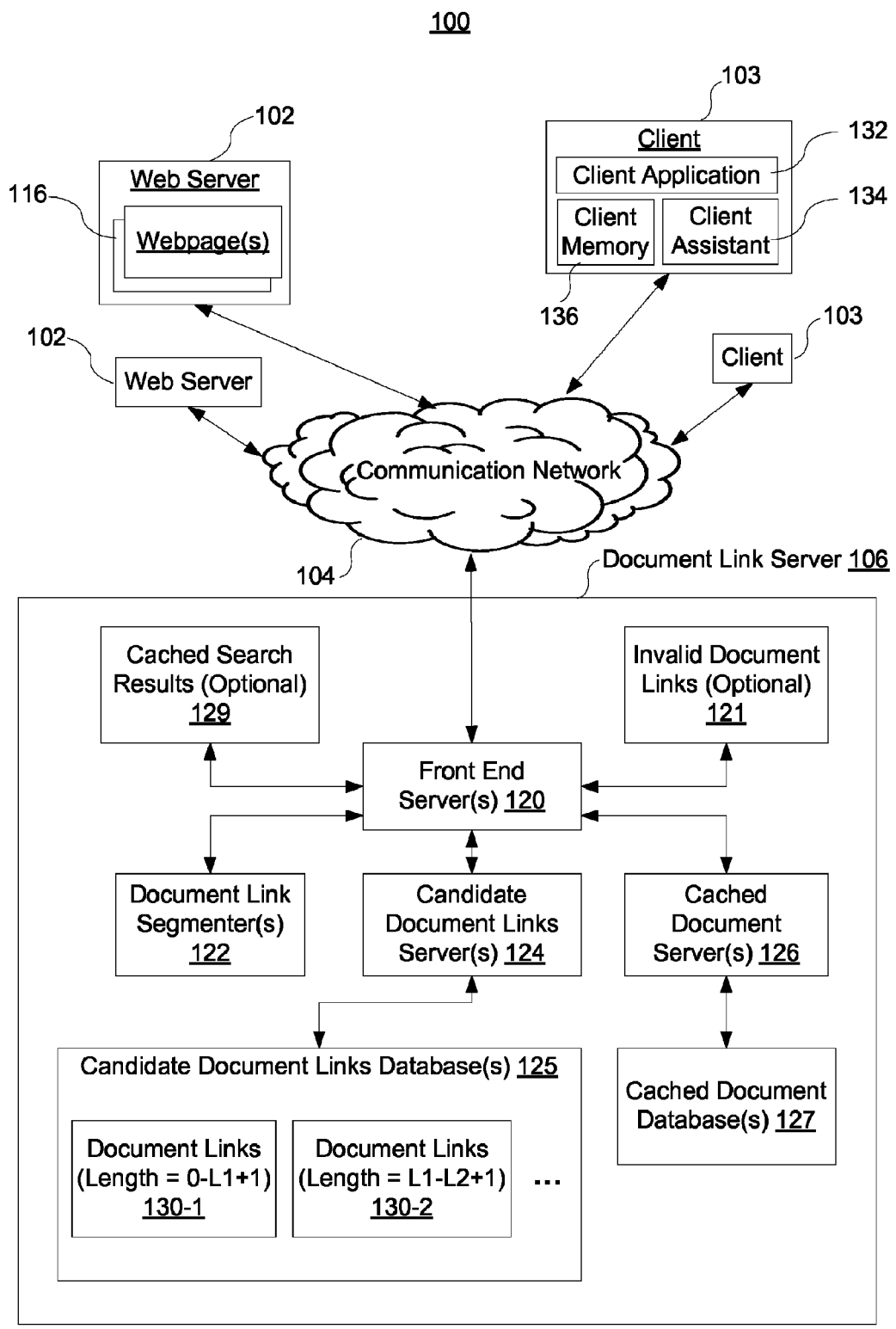
FIG. 1 is a block diagram of an exemplary distributed system that includes a plurality of clients and web servers requesting information from a document link server in accordance with some embodiments.

FIG. 1 is a block diagram of an exemplary environment 100 for implementing some embodiments of the present invention. One or more web servers 102 and clients 103 are connected to a communication network 104. The communication network 104 can be connected to a document link server 106. The document link server 106 may include one or more front end servers 120, one or more document link segmenters 122, one or more candidate document links servers 124, one or more cached document servers 126, one or more candidate document links databases 125, and one or more cached document databases 127.

In some embodiments, the document link server 106 may include multiple cached search results 129 that have been generated by the document link server previously in response to user-identified document links. After receiving a new document link from a client 103, the front end server 120 checks if there is a cached search result corresponding to the new document link. If so, the front end server 120 may return the cached search result to the requesting client 103, thereby improving the document link server's efficiency. If not or if the cached search result is deemed to be no longer servable (e.g., because the cached search result is stale), the front end server 120 then communicates with other components of the document link server 106 to generate a new search result for the same document link. Once the new search result is ready, a copy of the search result is stored in the cached search results 129 for future use.

In some embodiments, the document link server 106 may optionally include a set of invalid document links 121. Accordingly, the front end server 120 performs a screening process on any search result to remove invalid document links from the search result before serving it to a requesting client or web server. In some embodiments, the document link server 106 updates the set of invalid document links 121 according to a predefined schedule such as daily. In some other embodiments, the document link server 106 eliminates the invalid document links from the candidate document links database 125 and the cached search results 129. In this case, it may be unnecessary to keep the set of the invalid document links 121.

In some embodiments, the candidate document links in the candidate document links databases are organized into different segments 130-1, 130-2, etc. by their respective lengths (i.e., the number of characters in a document link). Different segments can be stored in the memories of different computers or in the same computer's memory. Since the candidate document links database 125 may contain billions of document links, the segments 130-$x$ of the database are typically stored in the memories of multiple computers. For a given user-specified document link, which has a known length, the candidate document links server 124 only needs to search a small number of the document links segments 130-$x$. In some embodiments (FIG. 1), a small number of document links appear in adjacent segments (e.g., segments 130-1 and 130-2). As will be explained below, this configuration improves the document link server's efficiency when performing an approximate search for a user-identified document link.

In some embodiments, the document link server 106 contains a subset or superset of the elements illustrated in FIG. 1. Although FIG. 1 shows the document link server 106 as a number of discrete items, the figure is intended more as a functional description of the various features that may be present in the document link server 106 rather than a structural representation of the various embodiments. In practice, items shown separately could be combined and some items could be further separated, as would be recognized by one of ordinary skill in the art of designing such systems. For example, the databases 125 and 127 shown separately in the figure could be implemented by a single database server. The actual number of computers constituting the document link server 106 and the allocation of features among the computers may vary from one implementation to another, and may depend in part on the amount of traffic that the document link server 106 handles during peak usage periods as well as during average usage periods.

A web server 102 is typically a collection of web pages 116 associated with a domain name on the Internet. A document link comprises or contains a URL that uniquely identifies the location of a web server or a web page on the Internet. The user of a client device or computer can visit a web server or web page by entering its URL in a browser window or by mouse-clicking a document link embedded in a web page. Depending on the context, the term "web server" as used in this specification refers to a logical location (e.g., an Internet or intranet location) identified by a URL.

A client 103 can be any of a number of devices (e.g., a computer, an internet kiosk, a personal digital assistant, a cell phone, a gaming device, a desktop computer, or a laptop computer) and can include a client application 132, a client assistant 134, and/or client memory 136. The client application 132 can be a software application that permits a user to interact with the client 103 and/or network resources to perform one or more tasks. For example, the client application 132 can be a web browser (e.g., the computer program available under the trademark Firefox®) or other type of application (e.g., a search engine application provided by Google) that permits a user to search for, browse, and/or use resources (e.g., web pages and web services) located at the web server 102. The resources at web server 102 are accessible to the client 103 via the communication network 104. The client assistant 134 can be a software application that performs one or more tasks related to monitoring or assisting a user's activities with respect to the client application 132 and/or other applications. For instance, the client assistant 134 assists a user at the client 103 with browsing for resources (e.g., files) hosted by the website 102; processes information items (e.g., search results) generated by the document link server 106; and/or monitors the user's activities on the search results. In some embodiments, the client assistant 134 is part of the client application 132, available as a plug-in or extension to the client application 132 (provided, for example, from various online sources), while in other embodiments the client assistant 134 is a stand-alone program separate from the client application 132. In some embodiments the client assistant 134 is embedded in one or more web pages or other documents downloaded from one or more servers, such as the document link server 106 and the web servers 102. Client memory 136 can store information such as web pages, search results received from the document link server 106, system information, and/or information about a user.

The communication network 104 can be any wired or wireless local area network (LAN), metropolitan area network, and/or wide area network (WAN), such as an intranet, an extranet, or the Internet, or it may be a combination of such networks. It is sufficient that the communication network 104 provide communication capability between the web servers 102, the clients 103 and the document link server 106. In some embodiments, the communication network 104 uses the HyperText Transport Protocol (HTTP) to transport information using the Transmission Control Protocol/Internet Protocol (TCP/IP). The HTTP permits client computers to access various documents available via the communication network 104. The various embodiments of the invention, however, are not limited to the use of any particular protocol. The term "document" as used throughout this specification refers to any piece of information or service that is accessible via a document link and can be, for example, a web page, a file of certain format, a database record, an image, a computational object, or other information items.

To overcome the deficiencies of the conventional approaches when handling inoperative document links, the document link server 106 collects a large number of operative URLs and stores them in the candidate document links database 125. A URL is deemed "operative" if it references a document that is actually available at a remote storage device (e.g., a web server 102). To produce reliable search results, the document link server 102 (or one of its components) periodically updates the database 125 by removing inoperative URLs from the database and inserting newly emerging operative URLs into the database. In some embodiments, this database update occurs daily, or even more frequently. In some other embodiments, a URL in the database 125 has an associated time-to-live (TTL), which triggers a self-examination if the remaining TTL is below a predefined threshold level.

Figure 2A:
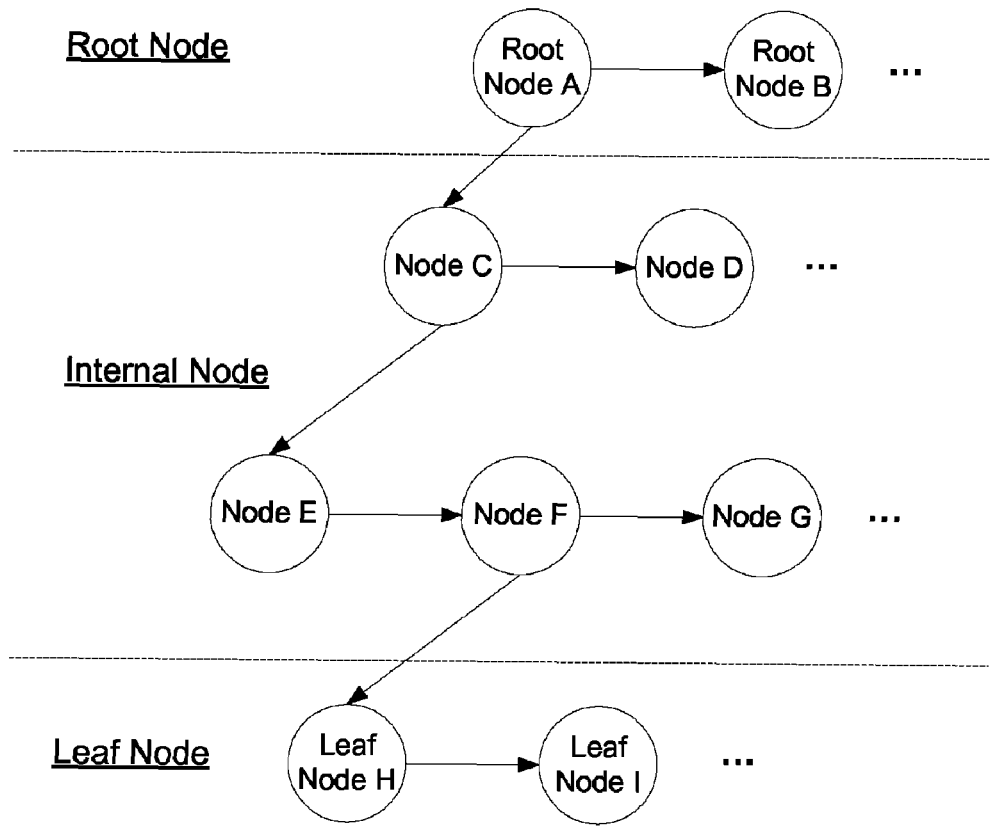
FIGS. 2A through 2C are block diagrams illustrative of data structures for managing a large number (e.g., billions) of URLs in a document links database in accordance with some embodiments.
Figure 2B:
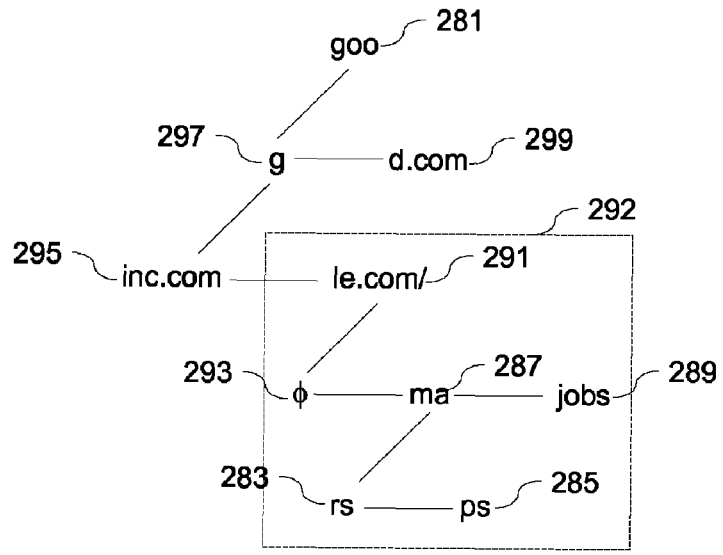
Figure 2C:
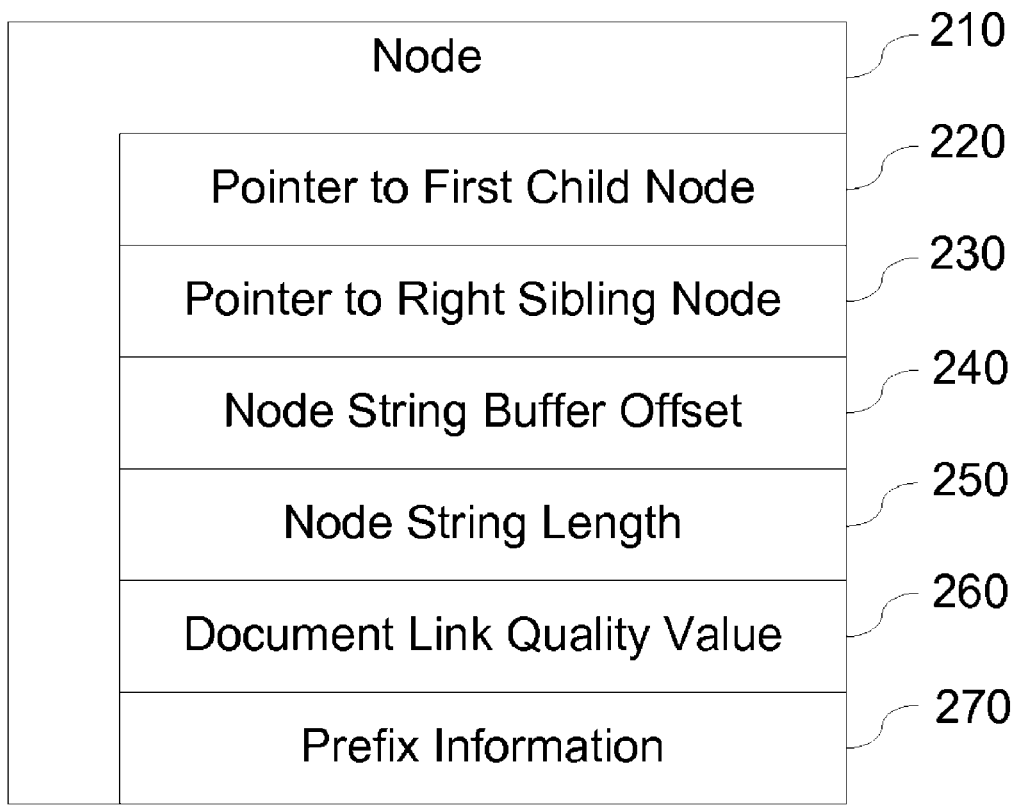

FIGS. 2A through 2C are block diagrams illustrative of data structures for managing the large number (e.g., billions) of URLs in the database 125 in accordance with some embodiments. As shown in FIG. 2A, a document links tree 200 adopts the form of a radix tree (also known as PATRICIA tree), which is a well-known specialized data structure for storing related text strings efficiently. The document links tree 200 includes three types of tree nodes: (i) a root node, (ii) internal nodes, and (iii) leaf nodes. At least one node corresponds to a substring of a URL such that the concatenation of the substrings starting at a root node, through one or more internal nodes and ending at a leaf node is a complete operative URL.

FIG. 2B depicts an exemplary document links tree 280. For instance, the concatenation of the substring "goo" at the root node 281 to a sequence of substrings at intermediate nodes (e.g., nodes 297, 291, 287) and to the string "rs" at the leaf node 283 corresponds to the URL www.google.com/mars. Similarly, the concatenation of the substring "goo" at the root node 281 to a sequence of substrings at intermediate nodes (e.g., nodes 297, 291, 287) and the string "ps" at the leaf node 285 corresponds to the URL www.google.com/maps. The close resemblance of the two URL strings is reflected by the fact that they are closely located on the document links tree 280.

In some embodiments, the text strings of the URLs associated with the document link tree 200 are not directly stored at the tree nodes, but in a separate large string buffer. In this case, related URLs such as www.google.com, www.google.com/mars, and www.google.com/maps are stored at adjacent locations (or, alternately, nearby locations) in the string buffer. FIG. 2C is a block diagram illustrating several data elements within a tree node 210. The node 210 contains two pointers: the pointer of the node's first child node 220 and the pointer to the node's right sibling node 230. In some embodiments, the order of the sibling nodes at a certain level of the document links tree is arbitrary. Because the text substring associated with the node 210 is stored in the separate string buffer, the node 210 has the substring's offset 240 in the string buffer and the substring's length 250.

In some embodiments, the node 210 also has a quality value 260, also called the document link quality value. In some embodiments, a leaf node's quality value is the popularity metric of the URL associated with the leaf node, which is at least in part dependent upon the page rank, the user-visit frequency, and other attributes of the web page identified by the URL. An internal node's quality value is the maximum of the quality values of the internal node's descendent nodes. Other definitions of a leaf node's quality value or an internal node's quality value may be used in other embodiments.

Referring again to FIG. 2B, assuming that the respective quality values of the node 283 (which corresponds to URL www.google.com/mars) and the node 285 (which corresponds to URL www.google.com/maps) are 5 and 20, the quality value of the node 287 (which corresponds to an incomplete URL www.google.com/ma that has no associated web page) is the maximum of the two, i.e., 20. Note that the node 289 is not a child node of the node 287, but its right sibling node.

In some embodiments, an internal node may correspond to a complete URL that has its own quality value. For example, the node 291 in FIG. 2B corresponds to the URL www.google.com/, which is a popular website with a quality value higher than that of any of its descendent nodes in the tree 280. In this case, a node 293 with an empty string φ is set to be the first child node of the node 291 and its quality value is set to be the quality value of the URL www.google.com/. The quality value of the node 291 is then set to be the maximum of the quality values of its descendent nodes 293, 287, 289, 283, and 285.

Some URLs have the prefix "www" and some don't. In practice, the web browser usually treats a URL with or without the prefix "www" in the same manner by automatically converting a URL without the "www" prefix, such as "google.com," into a URL with the "www" prefix, such as www.google.com. To be consistent with this common practice, in some embodiments, the document link server 106 removes the prefix "www" from a URL before inserting the URL into the document links tree. The prefix information 270 in the node 210 is used to indicate whether the URL includes the "www" prefix or not. For example, the prefix information 270 is a single binary bit with "1" representing that the URL has the prefix and "0" representing that the URL does not have the prefix.

From the large number of document links in the database 125, the document link server 106 generates a document links tree 200 by inserting the document links into the tree 200. After identifying an inoperative URL in the database 125, the document link server 106 removes the leaf node corresponding to the inoperative URL from the tree. Similarly, the document link server 106 generates a new leaf node in the tree for at least one new URL inserted to the database 125. In some embodiments, the maintenance of the document links tree is an offline process that has no adverse impact on the on-line performance of the document link server 106.

Because the information items provided by the document link server 106 are driven by requests submitted by a client 103 and/or a web server 102, we first describe the client-side operations associated with the document link server 106 and then discuss the server-side operations in more detail. Finally, several exemplary screenshots are provided to highlight the information items generated by the document link server 106 in response to an inoperative user-identified document link.

Figure 3:
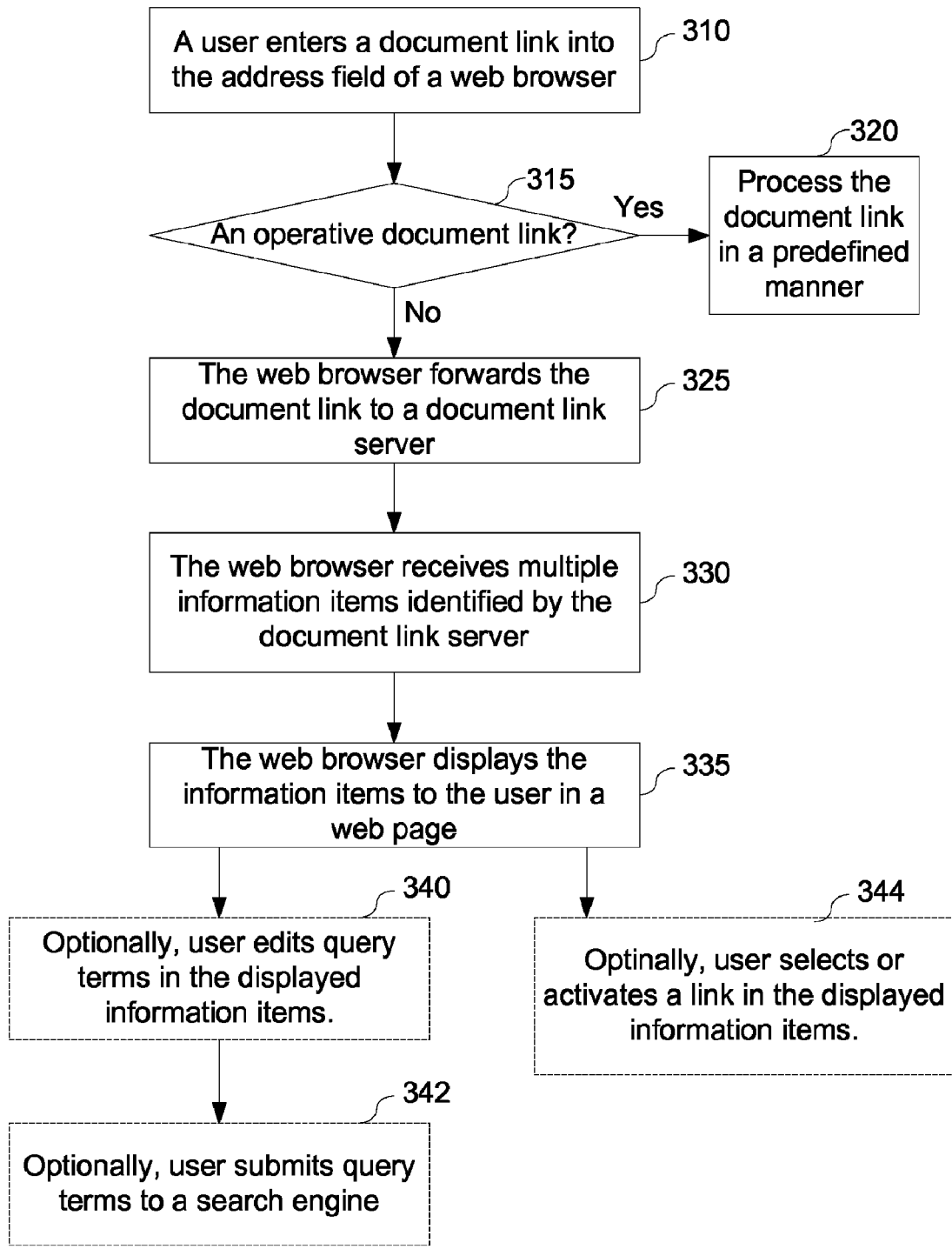
FIG. 3 is a flowchart illustrative of how a client application at a client computer responds to a user-provided document link in accordance with some embodiments.

FIG. 3 is a flowchart illustrative of how a client application at a client computer responds to a user-provided document link in accordance with some embodiments. For illustrative purposes, a web browser is chosen to be the client application. Initially, a user enters a document link such as a URL into the address field of the web browser (310). The web browser then checks if the user-entered URL is operative or not (315).

If, for example, after consulting its domain name service (DNS) cache, the web browser determines the URL is operative (315, yes), the web browser then processes the URL in a predefined manner (320) such as submitting a HTTP request to the corresponding web server, requesting the web page identified by the URL. As will be explained below in connection with FIG. 4, a URL that appears to be operative when tested by the client device may nevertheless be an inoperative URL. If so, the web server may detect that the URL is inoperative and then act to return useful information items to the requesting user.

If the URL is deemed to be inoperative (315, no), e.g., if the web browser is unable to associate an IP address with the URL, the web browser then forwards a request containing the inoperative URL to a document link server 106 (325). Other possible reasons that a specified URL is inoperative include that no document is at the location corresponding to the URL, there is a misspelled term in the URL, and the URL is incomplete. A description of the operations at the document link server 106 is provided below in connection with FIGS. 5 through 7.

In response to the request sent to the document link server, the web browser receives multiple information items identified by and returned from the document link server 106 (330) and then displays at least one of the information items to the user in a web page (335). In some embodiments, the information items include one or more query terms extracted from the user-identified URL, at least one of the query terms being different from the user-identified URL, and one or more candidate document links that the document link server 106 has identified in accordance with the user-identified URL, at least one candidate document link referencing a document that is available at a remote storage device. A more detailed description of the candidate document links is provided below in connection with FIGS. 5 through 7. Optionally, the user may select or activate any of the candidate document links in the displayed information items (344).

In some embodiments, the web browser at the client receives a web page that includes a search box containing the query terms and an associated search button. Alternately, in some embodiments the web browser places the query terms in a search box having an associated search button in a toolbar of the web browser. Optionally, the user can edit the query terms by, e.g., by changing or deleting one or more of the provided query terms and/or by adding new ones into the search box (340). The user can submit a search query including the query terms (e.g., either the originally provided query terms, or an edited version of the query terms) to a search engine (342). This may be done, for example, if the user is not satisfied with the candidate document links provided by the document link server 106. In some embodiments, the search engine is the default search engine of the web browser. In some other embodiments, the search engine is the search engine of the web server. If both search engines exist, the web page may include two search boxes, one for the default search engine and the other for the web server's search engine. The query terms in the two search boxes may or may not be the same.

In some embodiments, the information items returned by the document link server include a link to a search, within a web site specified by or associated with the user-identified URL, for one or more query terms extracted from the user-identified URL. For example, in response to the user-identified URL www.apple/foo, the document link server may include information items that include a link to a search for the term "foo" within the www.apple.com website. This information item may be called a "search within website" item, because user selection of this item initiates a search whose scope is limited to the web pages in a particular website. If both a "search within website" information item and a search box information item are returned to the requesting client, the query terms in the two items may be different, and the search results produced by the two searches may be different. For instance, the search results from the "search within website" item will contain only links to web pages within a single website, whereas the search results for the search box item may contain links to web pages from multiple websites. In another example, the search box item may contain one or more terms extracted from the domain name portion of the user-identified URL, as well one or more terms extracted from another portion of the user-identified URL, while the search terms in the "search within website" item may include only terms extracted from portions of the user-identified URL other than the domain name portion.

In some embodiments, the information items may include a link to a cached copy of a document corresponding to the user-identified document link. This is possible if the user-identified URL corresponds to a web page that, although unavailable at the location specified by the URL, has a cache copy in the cached document database 127. The user may optionally choose to select or activate the link to the cached document (344), for example, if the user believes that the user-identified URL does not have any error.

Note that the aforementioned operations can be used to process any type of user-identified document link, including a document link entered into the search box of a search engine application, a document link selected from a web page, or a document link that has been manually entered by a user into a client application such as a browser application.

A user-identified URL that reaches a web server can still be an inoperative URL. When this occurs, conventional approaches adopted by most web servers are to either return a web page including a generic error message, e.g., "404 error: File not found," or return a customized (but still static) web page indicating that the user-identified URL is probably incorrect.

Figure 4:
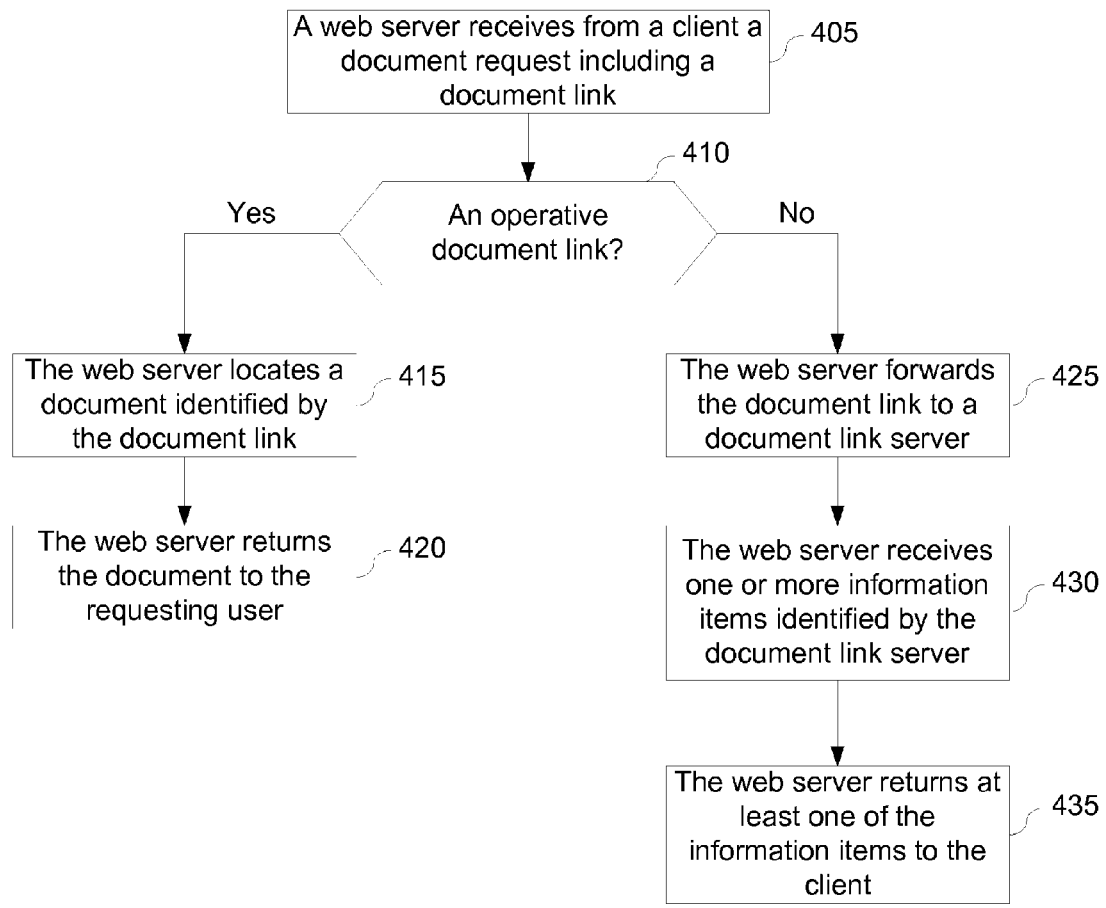
FIG. 4 is a flowchart illustrative of how a server (e.g., a web server) responds to a user-provided document link in accordance with some embodiments.

Contrary to these approaches, FIG. 4 is a flowchart illustrative of how a web server responds to a user-provided document link in accordance with some embodiments. In the process depicted in FIG. 4, the web server can be considered to be a client from the perspective of the document link server, and therefore the process depicted in FIG. 4 is similar to the process described above in connection with FIG. 3.

In response to a user-identified URL embedded in a document request (405), the web server checks if the URL is operative or not (410). In some embodiments, the URL includes the domain name of the IP address of the web server. When multiple domain names are associated with the IP address of the web server, the URL contains a domain name associated with the IP address of the web server.

If the URL is operative, i.e., there is a web page corresponding to the URL (410, yes), the web server then locates the web page (415) and returns the web page to the requesting user (420). Otherwise (410, no), the web server forwards the inoperative URL to a document link server for further processing (425) and receives, in response, one or more information items from the document link server (430). Possible reasons that the URL is inoperative include that no document is at a location corresponding to the URL, there is a misspelled term in the URL, or the URL is incomplete.

The web server returns at least one of the information items to the client (435). In some embodiments, the information items include one or more query terms extracted from the user-identified URL, at least one of the query terms being different from the user-identified URL, and one or more candidate document links that the document link server 106 has identified in accordance with the user-identified URL, at least one candidate document link referencing a document that is available at a storage device that is remotely located with respect to the client (e.g., at a server 102 that is linked to the client 103 by the communication network 104). In one embodiment, the information items include a link to a search query that when executed searches only for web pages within the website specified by the user-identified URL. Although the "search within website" search query may comprise query terms extracted from the user-identified URL, the corresponding search result may be different from the search result that would be produced by a generic search engine service.

In some embodiments, the query terms returned by the document link server are transmitted to the client in a web page that includes a search box in which the query terms have been inserted and an associated search button. The web page with the search box is rendered by a client application (e.g., a web browser) running at the client computer. Alternately, in some embodiments the web browser places the query terms in a search box having an associated search button in a toolbar of the web browser. Optionally, the user can edit the query terms by, for example changing or deleting the query terms provided by the document link server and/or by adding new search terms into the search box. Optionally, the user can submit a search query including the query terms to a search engine. In some embodiments, the search engine is the default search engine of the client computer. In some other embodiments, the search engine is the search engine of the web server. If both search engines exist, the web page may include two search boxes, one for the default search engine and the other for the web server's search engine. The query terms in the two search boxes may or may not be the same.

As described above, in some embodiments, the information items returned to the client may include a link to a cached copy of a document corresponding to the user-identified document link.

Figure 5:
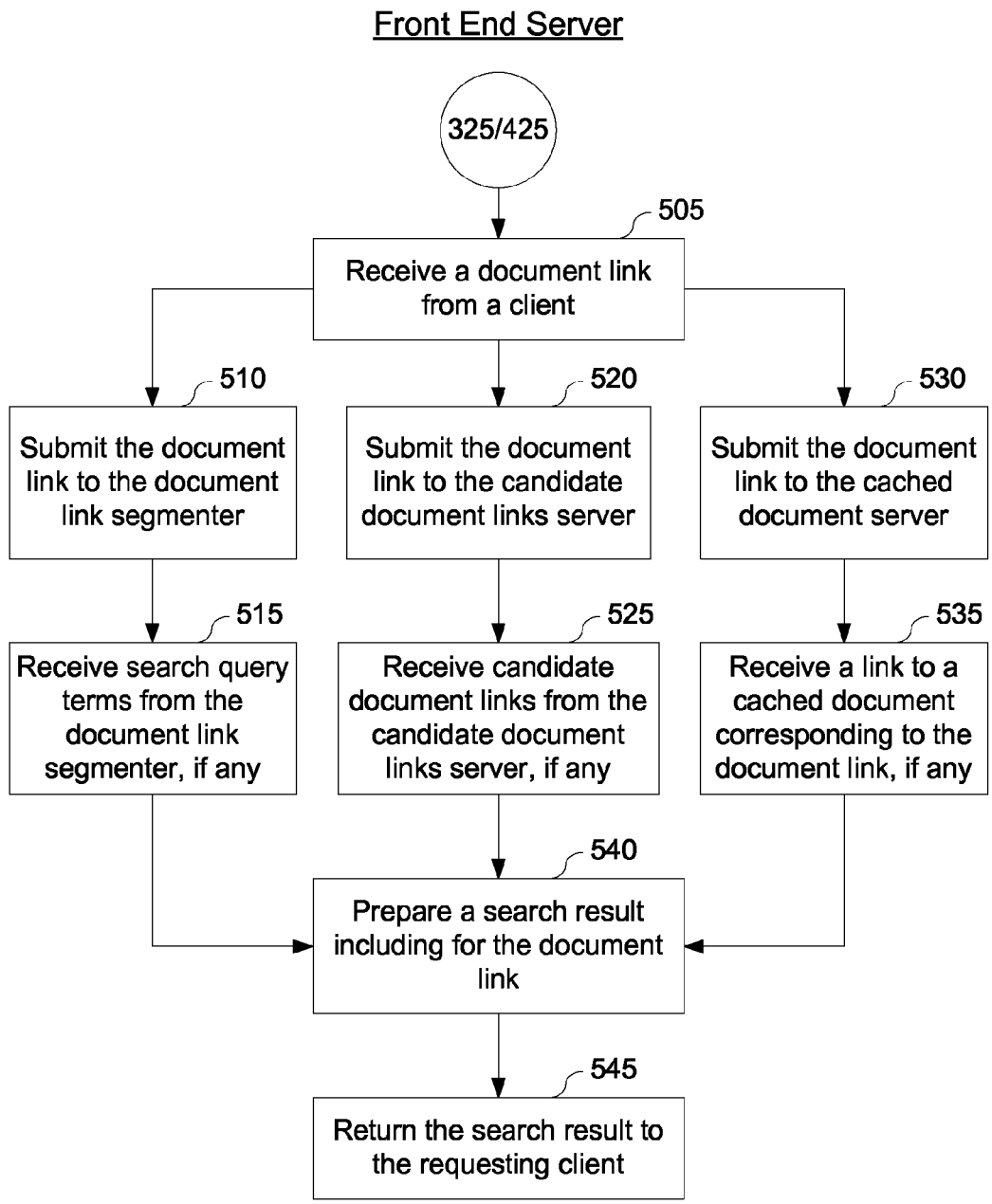
FIG. 5 is a flowchart illustrative of how a server (e.g., a document link server) prepares a search result including multiple information items in response to a user-identified document link in accordance with some embodiments.

FIG. 5 is a flowchart illustrative of how the document link server prepares a search result including multiple information items in response to a user-identified document link in accordance with some embodiments.

Upon receipt of the user-identified document link (505), the front end server 120 performs one or more of the following operations: (i) submitting the document link to the document link segmenter 122 (510), (ii) submitting the document link to the candidate document links server 124 (520), and (iii) submitting the document link to the cached document server 126 (530). In those embodiments in which all three of these operations are performed, the operations may proceed in parallel or sequentially in any order.

From the document link segmenter 122, the front end server 120 receives search query suggestions including zero or more query terms extracted from the user-identified document link (515). In some embodiments, at least one of the query terms is different from the document link, e.g., the query term may be a subset of the document link. In another embodiment, a respective query term may be based on text extracted from the document link, but need not comprise a subset of the document link. A more detailed description of this extraction process is provided below in connection with FIG. 6C.

From the candidate document links server 124, the front end server 120 receives zero or more candidate document links based on the user-identified document link (525). A more detailed description of this process is provided below in connection with FIGS. 6A and 7A-7C.

From the cached document server 126, the front end server 120 may receive a link to a cached copy of a document corresponding to the user-identified document link (535), if such a cached copy is present in the cached document database(s) 127. A more detailed description of this process is provided below in connection with FIG. 6B.

In some embodiments, the front end server 120 analyzes the information items, e.g., arranging the query terms in a specific order and selecting a subset of the candidate document links by sorting them by their respective quality values. More generally, the front end server 120 prepares a search result including at least some of the information items (540). This search result is then returned to the requesting client (545). From the document link server's perspective, the requesting client may be a web browser that has encountered an inoperative document link at a client 103 or a web server 102 receiving an inoperative document link from a client 103. In some embodiments, the document link server 106 identifies commercial information based on the query terms identified at operation 515 and candidate document links identified at operation 525 and returns the commercial information together with other information items to the requesting client.

Figure 6A:
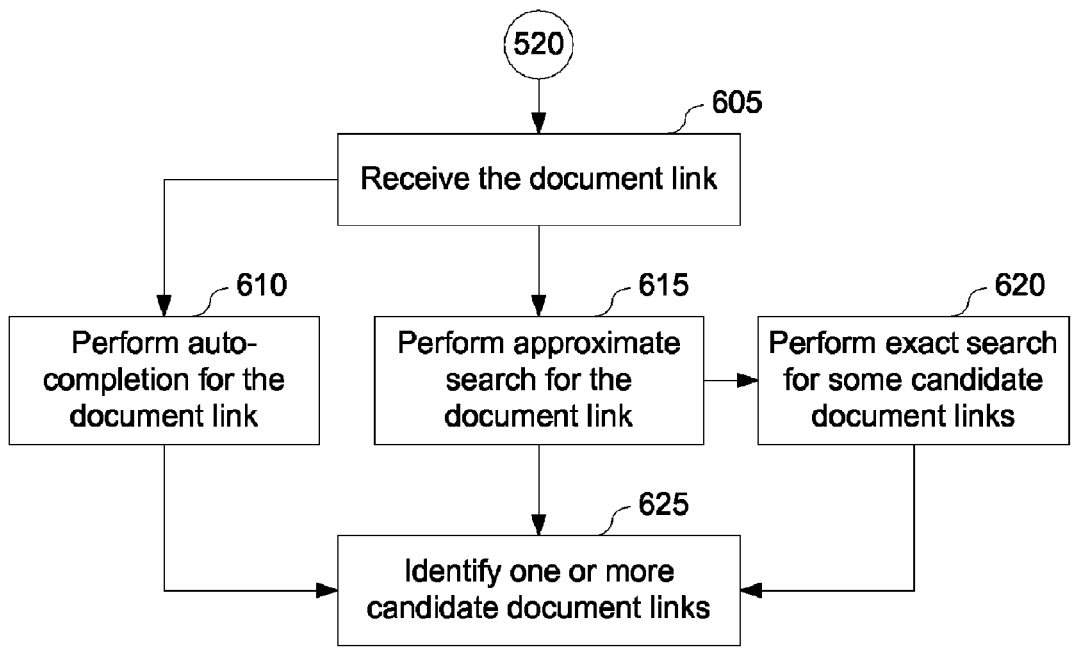
FIGS. 6A through 6C are flowcharts illustrative of the operations of different components of a server (e.g., a document link server) when processing a user-identified document link in accordance with some embodiments.
Figure 6B:
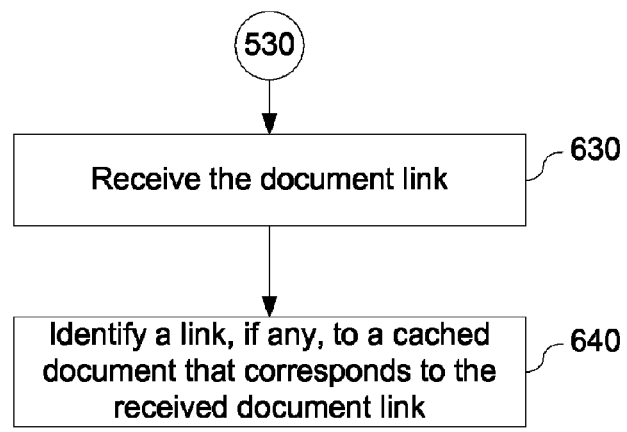
Figure 6C:
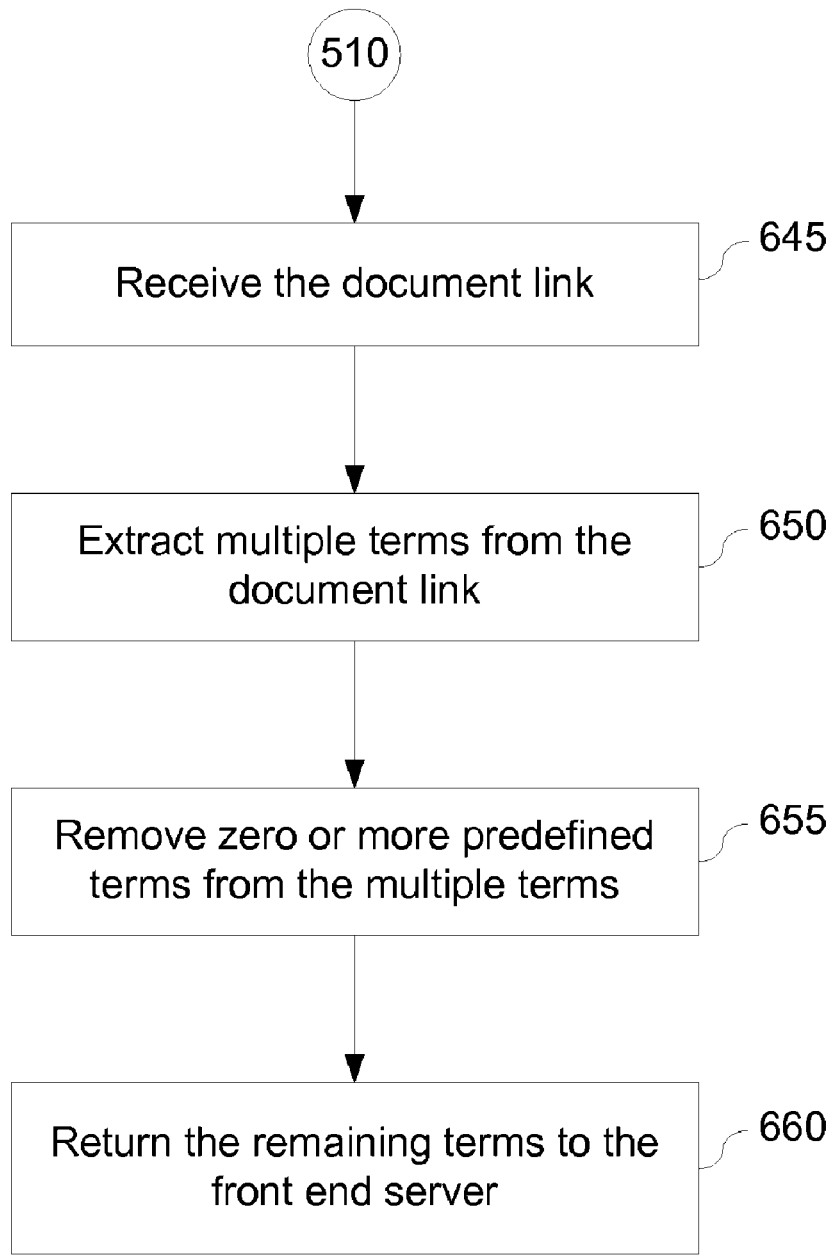

FIGS. 6A through 6C are flowcharts illustrative of the operations of different components of the document link server when processing a user-identified document link in accordance with some embodiments.

In particular, FIG. 6A is a flowchart illustrating how the candidate document links server 124 performs operations such as auto-completion (610), approximate search (615), and exact search (620) on a user-identified document link received by the front end server 120. A more detailed description of the three operations is provided below in connection with FIGS. 7A through 7C. In some embodiments, not all the three types of operations are applicable to a particular document link, in which case one or more of the operations may return zero candidate document links. However, for the large majority of user-identified document links, at least one of the three types of operations generates one or more candidate document links to be returned to the requesting client. The candidate documents link server 124 identifies a subset of the candidate document links as qualified ones based, at least in part, on quality values of the links that are stored in the document links tree 200.

FIG. 6B is a flowchart illustrating how the cached document server 126 identifies a link to a cached copy of a document corresponding to the user-identified document link received by the front end server 120 (630, 640). This is a relatively straightforward process that yields a yes-or-no answer for a given document link.

FIG. 6C is a flowchart illustrating how the document link segmenter 122 extracts query terms from the user-identified document link. Upon receipt of the document link (645), the segmenter 122 breaks the link into multiple terms (650). Many well-known algorithms for extracting terms can be employed to perform the operation 650. The segmenter 122 removes zero or more predefined terms from the multiple terms (655) and return the remaining ones, if any, to the front end server (660). Exemplary terms that are be removed include pronouns such as "they", "it", and "us," conjunctives such as "and", "or", and "but", and other terms that may considered to be "noise" terms or the like. In some embodiments, the document link segmenter 122 returns all the query terms extracted from the document link to the front end server 120, which then removes the aforementioned predefined terms.

Typically, each of the terms extracted from the user-identified document link are distinct from the user-identified document link. In other words, the extracted terms are each a subset of the user-identified document link.

In another embodiment, in addition to extracting terms from the user-identified document link, the document link segmenter 122 supplements the extracted terms with "corrected terms," or more generally, one or more terms corresponding to text extracted from the user-identified document link. For example, a term (extracted from the user-identified document link) that matches a predefined term containing a well known spelling error (e.g., as determined by membership in a table or a database of misspelled terms) may be replaced by a replacement term (e.g., "stret" may be replaced by "street") or by a disjunction term (e.g., "stret" may be replaced by "(stret OR street)").

Figure 7A:
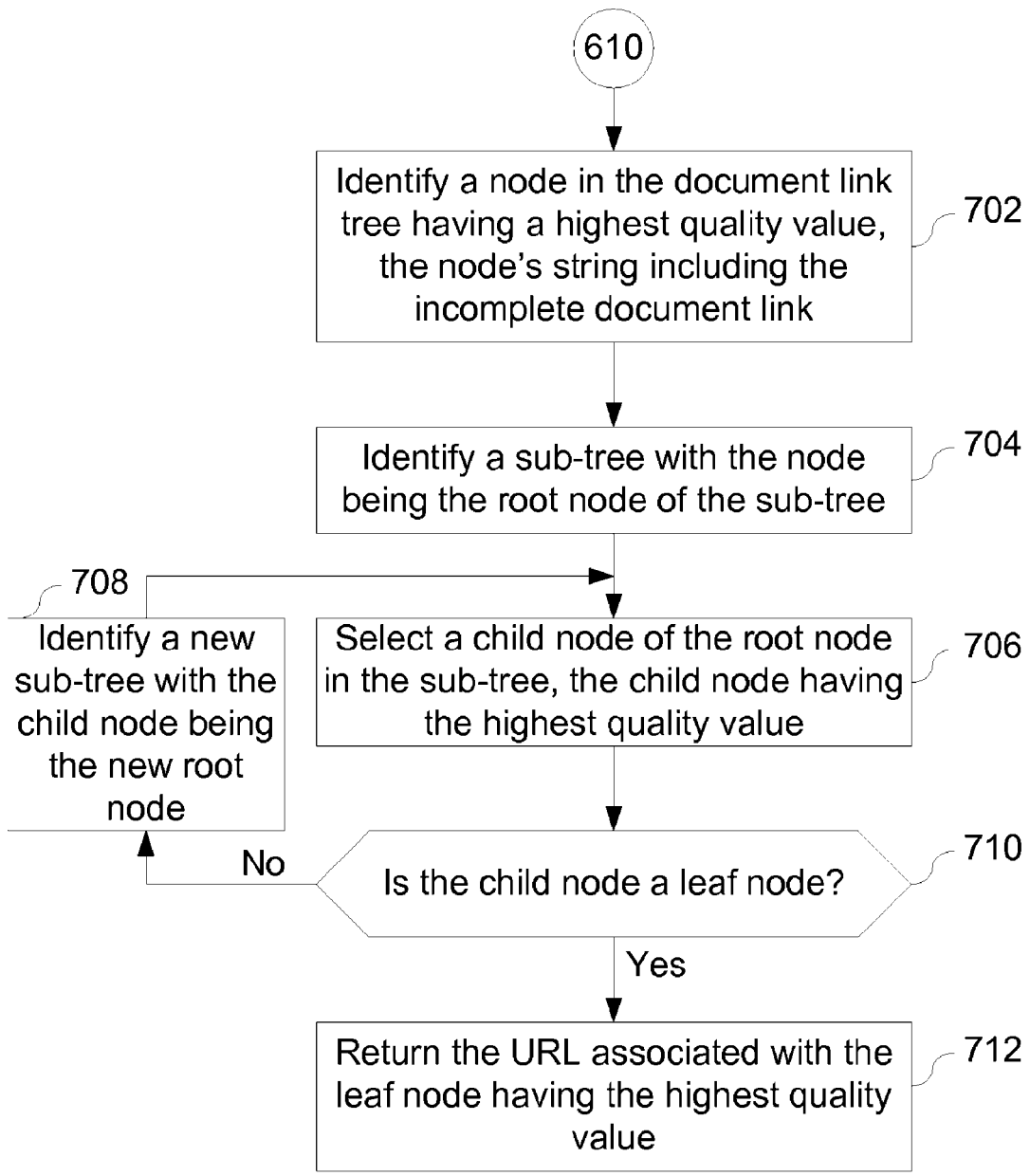
FIGS. 7A through 7C are flowcharts illustrative of how a server (e.g., a candidate document links server) processes a user-identified document link in accordance with some embodiments.
Figure 7B:
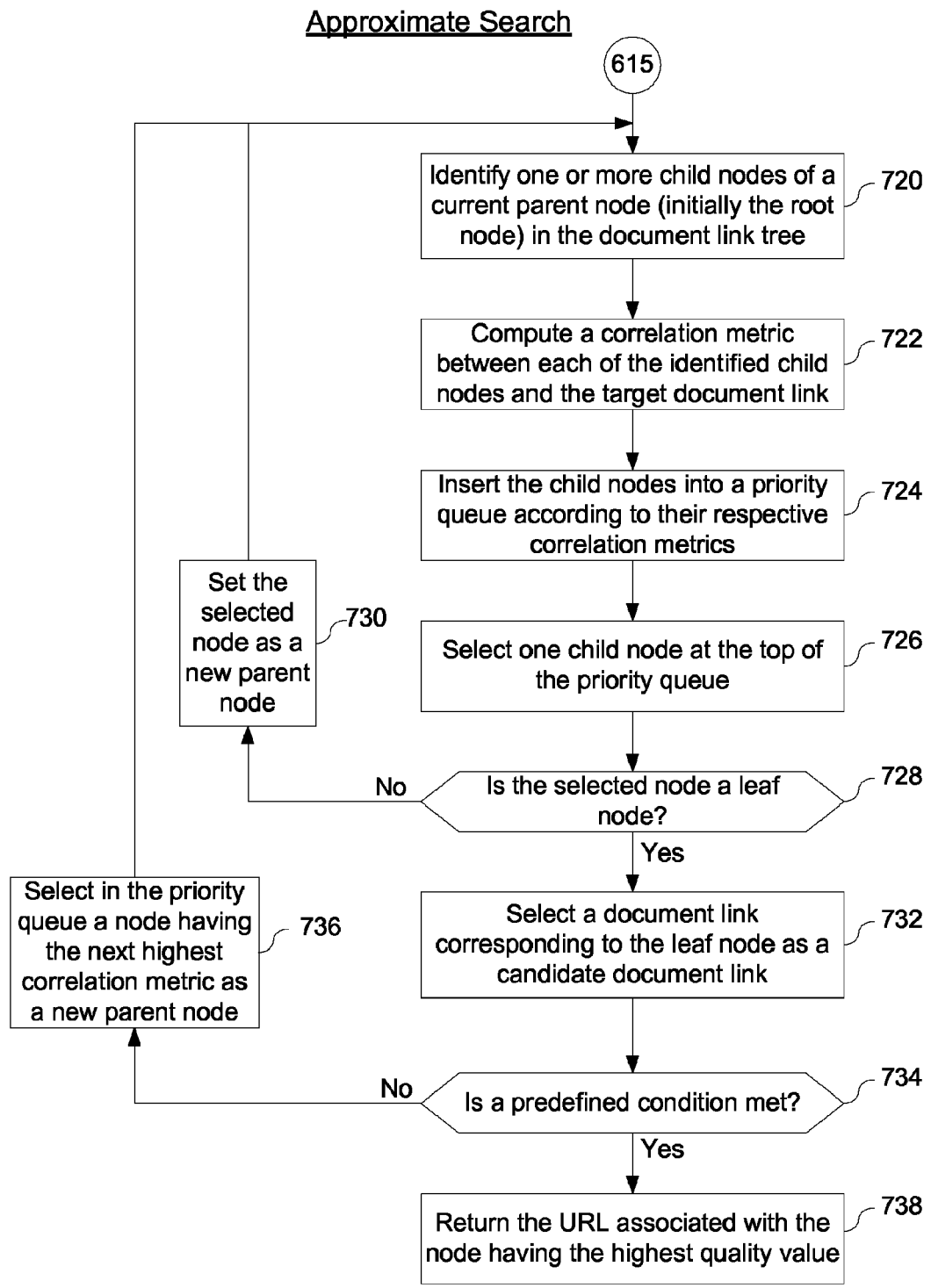
Figure 7C:
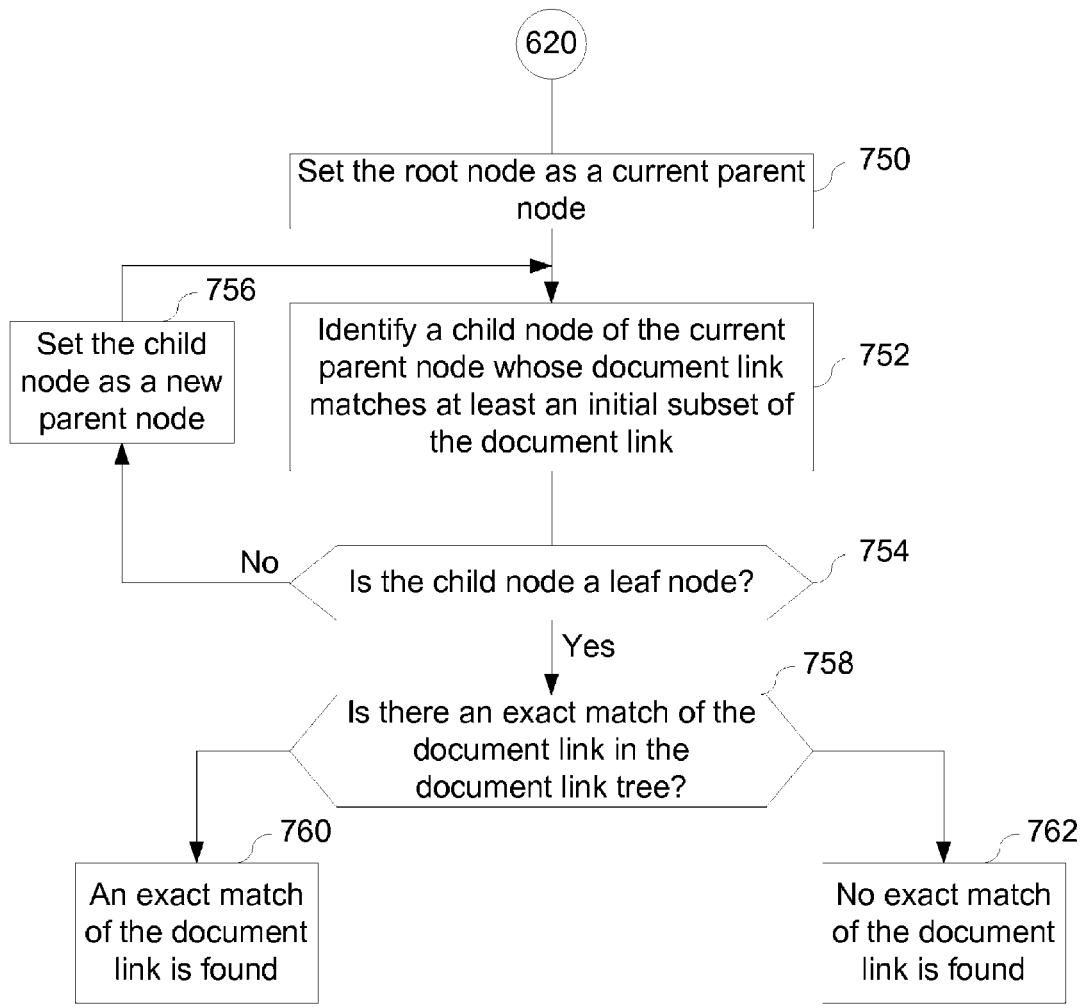

FIGS. 7A through 7C are flowcharts illustrative of how a candidate document links server processes a user-identified document link in accordance with some embodiments.

FIG. 7A is a flowchart illustrating how the candidate document links server 124 automatically completes a user-identified incomplete document link using the document links tree 200. The candidate document links server 124 selects one or more nodes in the document link tree 200, each having a string encompassing the incomplete document link, and then identifies the one of those nodes that has the highest quality value (702).

To illustrate an example, assume that the user enters an incomplete URL www.goog into the address field of the web browser. FIG. 2B depicts that there are at least two internal nodes 291, 295 in the document links tree 280, each having a URL that encompasses the incomplete URL. They are www-.googinc.com (node 295) and www.google.com (node 291). The candidate document links server 124 chooses node 291 because it has a higher quality value than node 295.

The candidate document links server 124 identifies a sub-tree with the chosen node being the root of the sub-tree (704) and selects the child node of the root node in the sub-tree (706) that has the highest quality value of all the child nodes in the sub-tree. In some embodiments, the selected child node has the same quality value as the root node. In this example, the node 291 is the root node of the sub-tree 292 and it has a child node 293 having the same quality value as the node 291.

The candidate document links server 124 checks if the child node is a leaf node (710). If not (710, no), the candidate document links server 124 identifies a new sub-tree with the previously selected child node being the new root node (708), and then repeats operations 706, 710. If true (710, yes), the candidate document links server 124 returns the URL of the identified leaf node as the auto-completion result. In this example, because the node 293 is a leaf node and has the highest quality value, the URL associated with this node is chosen to be the auto-completion result for the incomplete URL www.goog.

In some embodiments, the candidate document links server 124 may return more than one auto-completion result if there are a plurality of nodes whose associated quality values are higher than a predefined threshold level. For example, depending on the available space for displaying multiple candidate document links, the candidate document links server 124 may return as many as N auto-completion results whose associated quality values are higher than the predefined threshold level, where N is a predefined maximum value (e.g., 2, 3, 4, 5, or 6). In some embodiments, the candidate document links server 124 may return as many as N auto-completion results whose associated quality values are higher than the predefined threshold level, but the client device may display a subset of the returned auto-completion results in order to comply with display space constraints. In some embodiments, the auto-completion process depicted in FIG. 7A is used to generate candidate document links while a user is entering a URL in the address bar of a browser application or other client application, with the resulting candidate document links being sent to the client for display to the user. If the user selects a respective displayed candidate document link, the URL of the candidate document link is entered in the address bar of the browser application or client application, thereby reducing the amount of work required by the user to enter a URL.

FIG. 7B is a flowchart illustrating how the candidate document links server 124 performs an approximate search for a user-identified document link using the document links tree 200 in accordance with some embodiments.

Initially, the candidate document links server 124 chooses the root node as the current parent node and identifies one or more child nodes of the root node in the document link tree 200 (720). Referring once again to FIG. 2B, consider an example in which the user-identified URL (or the target document link) is www.goofinc.com and the two child nodes of the root node 281 are the node 297 and the node 299. Further assume that the user-identified URL does not exactly match any node in the exemplary document links tree 280.

The candidate document links server 124 computes a correlation metric between at least one of the identified child nodes and the target document link (722). In some embodiments, the correlation metric is a function of the edit distance between the URL at the child node and the user-identified URL, the number of unmatched characters in the user-identified URL thus far, and the quality value of the URL at the child node. Other metrics that may be used for calculating the correlation metric include keyboard distance, soundex, etc. A high correlation metric value of a respective child node indicates that the child node's URL is more likely to be relevant to the user-identified URL and vice versa. In some embodiments, the method of calculating the edit distance between two strings is adjusted when used to compare two URLs. For example, the edit distance between terms like the top domain names "com" and "edu" and the file formats "html" and "php" is set to be 1 (which is the minimum edit distance between non-identical terms). In some embodiments, the candidate document links server 124 ignores the prefix "www" (if any) and the appending slash "/" (if any) of a URL when determining its edit distance with another URL.

In some embodiments, factors such as a lower edit distance, a lower number of unmatched characters, and a higher quality value associated with the child node may increase the correlation metric between the child node's URL and the user-identified URL. In contrast, a higher edit distance, a higher number of unmatched characters, and a lower quality value associated with the child node may decrease the correlation metric between the child node's URL and the user-identified URL.

As shown in FIG. 7B, the candidate document links server 124 inserts the child nodes into a priority queue according to their respective correlation metrics (724). In this example, the target document link is the user-identified URL www.goofinc.com and it is assumed that the correlation metric of the node 297 is higher than the correlation metric of the node 299 since the node 297 has a higher quality value and fewer unmatched characters. Therefore, in this example node 297 is ahead of node 299 in the priority queue.

The candidate document links server 124 selects one child node at the top of the priority queue (726), which has the highest correlation metric, and then checks whether the selected node is a leaf node (728). In this example, the node 297 is not a leaf node because the string "www.goog" is an incomplete URL. Accordingly, the candidate document links server 124 then sets the selected node as the new parent node (730) and returns to repeat the operations 720 through 728. In this example, the first leaf node identified by the candidate document links server 124 during this iterative process is the node 293 whose URL www.google.com/ is selected as a candidate document link (732).

The candidate document links server 124 checks if a predefined condition is met (734). In some embodiments, the predefined condition is that the server 124 has identified a predefined number of candidate document links. In some embodiments, the predefined condition is that the server 124 has performed a predefined number of search-related operations regardless of whether any candidate document links have been found. This stop-search condition is useful in some cases because it is possible that no candidate document link is in the database 125 for a given inoperative document link, and because the candidate document links server 124 is configured to report its search results, if any, to the front end server 120 within a certain time period (e.g., within a predefined fraction of a second).

If the predefined condition is not met (734, no), the candidate document links server 124 then selects the node having the next highest correlation metric in the priority queue (736) and repeats the operations 720 through 728. In this example, the next leaf node identified by the candidate document links server 124 during this iterative process is the node 295 whose associated URL www.googinc.com/ is selected as another candidate document link (732). Finally, the candidate document links server 124 returns the candidate URL with the highest quality value as the approximate search result. In some embodiments, multiple candidate document links are returned if they all meet a predefined condition, e.g., having a quality value that is higher than a predefined threshold level.

In some embodiments, when performing an approximate search, the candidate document links server 124 sets a limit on the edit distance between a candidate document link and the user-identified document link. For example, the candidate URL is deemed to be irrelevant if its edit distance from the user-identified document link is higher than a predefined limit, such as 2, 3 or 4.

In some embodiments, the candidate document links server 124 may use other techniques to generate candidate document links. For example, the candidate document links server 124 may generate one or more hypothetical document links by rearranging the query terms extracted by the document link segmenter 122 in certain orders based on their semantic meanings. For example, the document link segmenter 122 extracts at least two query terms "yahoo" and "mail" from the user-identified inoperative URL yahoo.mail.com. In this embodiment, the candidate document links server 124 reverses the order of the two terms in the URL, to form a candidate URL mail.yahoo.com.

In some embodiments, the candidate document links server 124 generates one or more candidate support document links corresponding to a respective candidate document link identified by the approximate search operation. Exemplary candidate support document links include a website's homepage and sitemap, etc. For at least one of the candidate support document links or the term-rearranged candidate document links, the candidate document links server 124 searches the document links tree 200 to confirm that (or to determine whether or not) the candidate support document link is an operative document link that corresponds to a known web page.

FIG. 7C is a flowchart illustrating how the candidate document links server 124 performs an exact search for a user-identified document link using the document links tree 200. Initially, the candidate document links server 124 sets the root node as the current parent node (750) and then identifies a child node of the current parent node such that the child node's associated document link matches at least an initial subset (also called a prefix or prefix portion) of the user-identified document link (752).

The candidate document links server 124 verifies whether the child node is a leaf node or not (754). If not (754, no), the candidate document links server 124 then sets the child node as the new parent node and repeats operations 752 and 754 until a leaf node is identified (754, yes).

For the identified leaf node, the candidate document links server 124 then checks if the leaf node's associated document link is an exact match of the user-identified document link (758). If not (758, no), the candidate document links server 124 returns a message indicating that no exact match is found (762). Otherwise (758, yes), the candidate document links server 124 returns a message indicating that an exact match is found (760).

Figure 8:
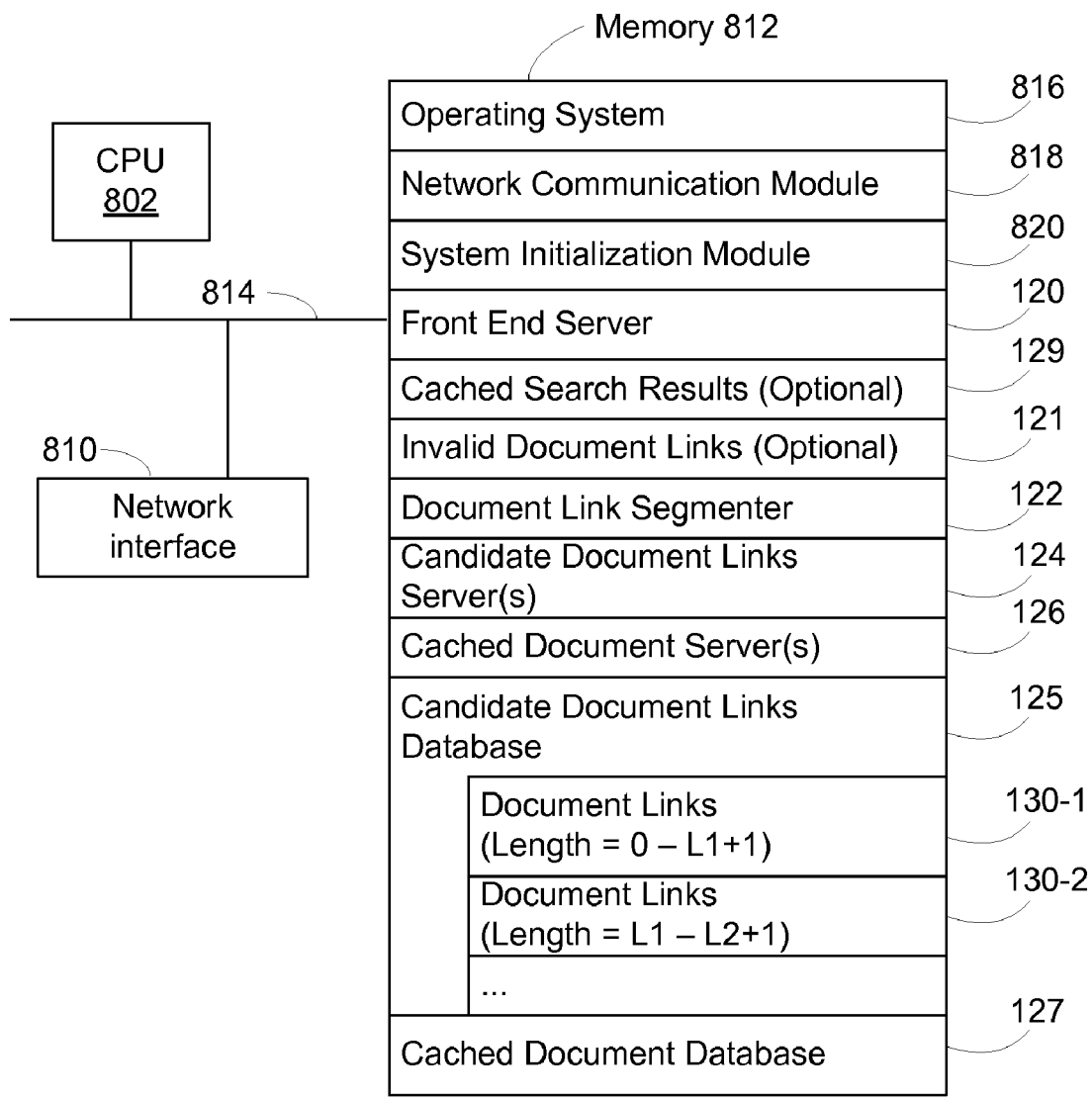
FIG. 8 is a block diagram of an exemplary document link server in accordance with some embodiments.

FIG. 8 is a block diagram of an exemplary document link server in accordance with some embodiments. The exemplary document link server 106 typically includes one or more processing units (CPU's) 802, one or more network or other communications interfaces 810, memory 812, and one or more communication buses 814 for interconnecting these components. The communication buses 814 may include circuitry (sometimes called a chipset) that interconnects and controls communications between system components. The document link server 106 may optionally include a user interface, for instance a display and a keyboard. Memory 812 may include high speed random access memory and may also include non-volatile memory, such as one or more magnetic disk storage devices. Memory 812 may optionally include mass storage that is remotely located from the CPU's 802. In some embodiments, memory 812 stores the following programs, modules and data structures, or a subset or superset thereof:

- an operating system 816 that includes procedures for handling various basic system services and for performing hardware dependent tasks;
- a network communication module 818 that is used for connecting the document link server 106 to other servers or computers via network interface 810 and one or more communication networks (wired or wireless), such as the Internet, other wide area networks, local area networks, metropolitan area networks, and so on;
- a system initialization module 820 that initializes other modules and data structures stored in memory 812 required for the appropriate operation of the document link server 106;
- a front end server 120 for processing an inoperative document link and preparing search results for the document link;
- a set of cached search results 129 previously generated by the document server 106;
- an optional set of invalid document links 121 that should be removed from any search result in response to a user-identified document link;
- a document link segmenter 122 for extracting query terms from a user-identified document link;
- a candidate document links server(s) 124 performing auto-completion, approximate search, and exact search (or a subset or superset of such operations) for a user-identified document link;
- a cached document server(s) 126 for retrieving a link to a cached copy of a document corresponding to a user-identified document link;
- a candidate document links database 125 for storing a large number of operative document links; and
- a cached document database 127 for storing a large number of cached documents, each corresponding to a document link.

Although FIG. 8 shows the document link server 106 as a number of discrete items, the figure is intended more as a functional description of the various features which may be present in the document link server 106 rather than a structural schematic of the various embodiments. As noted above with reference to FIG. 1, in practice, items shown separately could be combined and some items could be further separated, as would be recognized by one of ordinary skill in the art of designing such systems. For example, the cached document database 127 could be implemented by one, two, or more distinct databases or database partitions spread over as many servers as needed to store and provide timely access to the data in the database(s). The actual number of computers constituting the document link server 106 and the allocation of features among the computers may vary from one implementation to another, and may depend in part on the amount of traffic that the document link server 106 handles during peak usage periods as well as during average usage periods.

FIGS. 9A through 9E are exemplary screenshots of a web browser displaying information items in response to a user-identified document link in accordance with some embodiments.

Figure 9A:
FIGS. 9A through 9E are exemplary screenshots of a web browser displaying information items in response to a user-identified document link in accordance with some embodiments.

As shown in FIG. 9A, a user enters a URL www.welsdar-go.com 902 into the address field of the web browser. Because there is no web page corresponding to the URL 902, the web browser submits the inoperative URL to the document link server 106. The document link server 106 then returns a search result including multiple information items, including a candidate URL www.wellsfargo.com 904 suggested by the server 106, a search box 906 including two query terms "wels" and "dargo" extracted from the user-entered URL 902, and a link 908 to additional information compiled by the document link server 106. The edit distance between the candidate URL 904 and the user-entered URL 902 is 2.

Figure 9B:
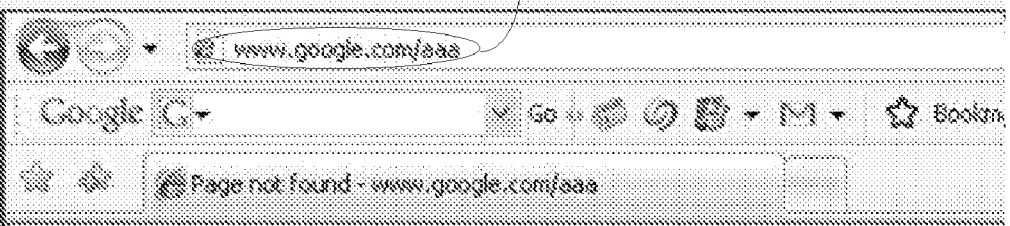

FIG. 9B is a screenshot of the web browser including a web page having multiple information items returned to the client in response to a user-entered inoperative URL 920 www.google.com/aaa. In this example, the information items include two candidate approximate URLs 922 www.google.com/a and www.google.com/ncr, the homepage 924 www.google.com of the website, the sitemap 926 www.google.com/sitemap.html of the website, and a link 928 to a search query that searches for the term "aaa" (extracted from the user-entered URL 920) within the website www.google.com as well as a search box 929 including two query terms, "google" and "aaa." As noted above in connection with FIG. 4, the two searches may produce different search results. For example, the search result associated with the link 928 will only return links to web pages within the website www.google.com while the search result associated with the search box 929 may return links to web pages both internal and external to the website www.google.com. In some embodiments, the search result produced by executing the search query in search box 929 may be a personalized search result according to the user's search preferences.

Figure 9C:
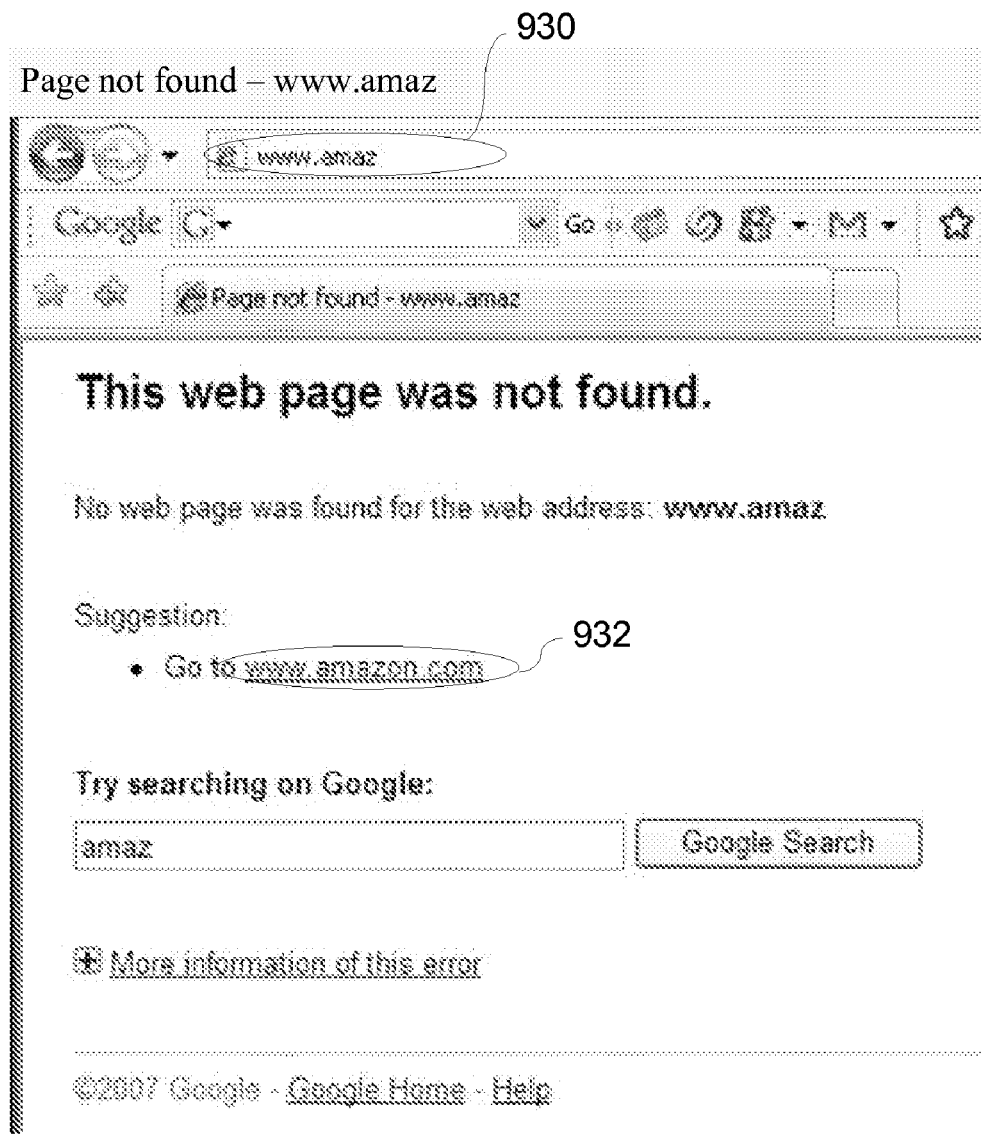

FIG. 9C is another screenshot of the web browser including a web page having multiple information items returned to the client in response to a user-entered incomplete URL 930 www.amaz. In this example, the document link server 106 identifies the URL www.amazon.com as the candidate complete URL with the highest quality value. The web page returned to the client, shown in FIG. 9C, has information items that include the candidate URL 932 www.amazon.com, and a search box including the query term "amaz."

Figure 9D:
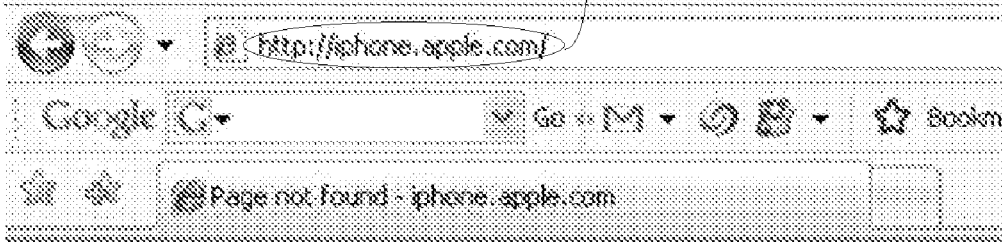

Referring to FIG. 9D, the web server of the website www.apple.com receives the user-entered URL 940 iphone.apple.com. Because it is inoperative, the web server then forwards the URL 940 to the document link server 106. Through rearranging the order of the terms in the user-entered URL 940, the document link server 106 identifies a candidate approximate URL 942 apple.com/iphone as the URL most proximate to the user's input. The web page returned to the client, shown in FIG. 9D, has information items that include the candidate approximate URL 942 apple.com/iphone, the homepage www.google.com of the website, and a search box 929 including the two query terms "iphone" and "apple." While the user-identified URL in this example does not have distinct domain name and other portions (because there is no forward slash in the user-identified URL), in some alternate embodiments the domain name portion (i.e., www.apple.com) and the non-domain name portion (i.e., "iphone") of the candidate approximate URL 942 may be used as the basis for generating a link to a search for the term "iphone" (obtained from the non-domain name portion of the candidate approximate URL 942) within the website identified by the domain name portion of the candidate approximate URL 942.

Figure 9E:
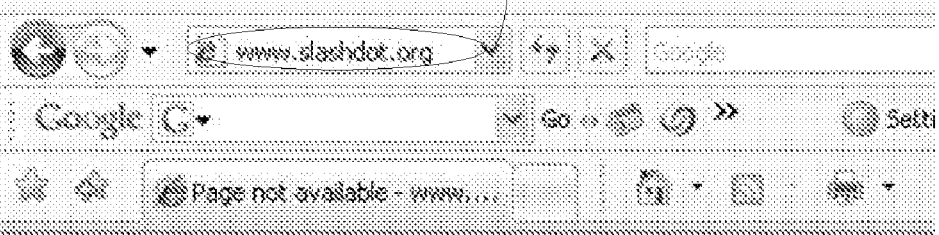

FIG. 9E is a screenshot of the web browser including information items in response to a user-entered inoperative URL 950 www.slashdot.org. In this example, although there is no error in the URL 950, the web browser cannot retrieve the web page because the web server corresponding to the URL 950 is temporarily down. But because the document link server 106 has already cached the web page, it returns a link 952 to the cached copy of the user-requested web page. Before serving the cached web page, the document link server 106 may need to perform certain tests to ensure that the cached web page has fresh content, not stale content. In some embodiments, the document link server 106 also returns one or more candidate document links (e.g., www.slashdog.org) in addition to the link 952 to provide more options for a user to choose.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
at a client computer with a display device and one or more processors and memory storing instructions for execution by the one or more processors,
while displaying a browser application having a displayed address field, receiving a user-identified document link;
submitting the document link to a server remotely located from the client computer;
in response to a determination that the user-identified document link is inoperative:
receiving multiple information items from the server; and
displaying at least a subset of the information items on the display device, including: (i) displaying a plurality of distinct user-editable query terms in a search box distinct from the displayed address field of the browser application, wherein at least one of the query terms is different from the user-identified document link and is selected from the group comprising text extracted from the user-identified document link and a term based on text extracted from the user-identified document link, (ii) displaying one or more candidate document links, wherein at least one candidate document link references a document that is available at a storage device remote from the client computer, and (iii) displaying a link to a cached document, which is a cached copy of a document distinct from documents corresponding to the one or more candidate document links, the cached copy comprising a cached copy of a document corresponding to the user-identified document link, wherein the link to the cached document is a link to a location remote from the client computer.

2. The method of claim 1, wherein the user identifies the document link by entering the document link into the address field of the browser application.

3. The method of claim 1, wherein the user identifies the document link by entering the document link into a search box of a search engine application.

4. The method of claim 1, wherein the user identifies the document link by selecting the document link embedded in a web page.

5. The method of claim 1, wherein the document link is submitted to the server after the client computer determines that the user-identified document link is inoperative.

6. The method of claim 5, wherein the user-identified document link is inoperative if the client computer is unable to retrieve a document from a location corresponding to the user-identified document link.

7. The method of claim 5, wherein the user-identified document link is inoperative if it includes at least one misspelled term.

8. The method of claim 5, wherein the user-identified document link is inoperative if it is incomplete.

9. The method of claim 1, wherein the user-identified document link is a link to a URL.

10. A client computer, comprising:
memory;
one or more processors;
a display device;
one or more programs stored in the memory and configured for execution by the one or more processors, the one or more programs including instructions for:
while displaying a browser application having a displayed address field, receiving a user-identified document link;
submitting the document link to a server remotely located from the client computer;
in response to a determination that the user-identified document link is inoperative:
receiving multiple information items from the server; and
displaying at least a subset of the information items on the display device, including: (i) displaying a plurality of distinct user-editable query terms in a search box distinct from the displayed address field of the browser application, wherein at least one of the query terms is different from the user-identified document link and is selected from the group comprising text extracted from the user-identified document link and a term based on text extracted from the user-identified document link, (ii) displaying one or more candidate document links, wherein at least one candidate document link references a document that is available at a storage device remote from the client computer, and (iii) displaying a link to a cached document, which is a cached copy of a document distinct from documents corresponding to the one or more candidate document links, the cached copy comprising a cached copy of a document corresponding to the user-identified document link, wherein the link to the cached document is a link to a location remote from the client computer.

11. The client computer of claim 10, wherein the instructions for submitting the document link to the server include instructions for determining whether the user-identified document link is inoperative and for submitting the document link to the server if the user-identified document link is determined to be inoperative.

12. The client computer of claim 11, wherein the user-identified document link is inoperative if the client computer is unable to retrieve a document from a location corresponding to the user-identified document link.

13. The client computer of claim 11, wherein the user-identified document link is inoperative if it includes at least one misspelled term.

14. The client computer of claim 11, wherein the user-identified document link is inoperative if it is incomplete.

15. A non-transitory computer readable storage medium storing one or more programs to be executed by a computer system comprising a client computer with a display device, the one or more computer programs comprising instructions for:
while displaying a browser application having a displayed address field, receiving a user-identified document link;
submitting the document link to a server remotely located from the client computer;
in response to a determination that the user-identified document link is inoperative:
receiving multiple information items from the server; and
displaying at least a subset of the information items on the display device, including: (i) displaying a plurality of distinct user-editable query terms in a search box distinct from the displayed address field of the browser application, wherein at least one of the query terms is different from the user-identified document link and is selected from the group comprising text extracted from the user-identified document link and a term based on text extracted from the user-identified document link, (ii) displaying one or more candidate document links, wherein at least one candidate document link references a document that is available at a storage device remote from the client computer, and (iii) displaying a link to a cached document, which is a cached copy of a document distinct from documents corresponding to the one or more candidate document links, the cached copy comprising a cached copy of a document corresponding to the user-identified document link, wherein the link to the cached document is a link to a location remote from the client computer.

16. The computer readable storage medium of claim 15, wherein the instructions for submitting the document link to the server include instructions for determining whether the user-identified document link is inoperative and for submitting the document link to the server if the user-identified document link is determined to be inoperative.

17. The computer readable storage medium of claim 16, wherein the user-identified document link is inoperative if the client computer is unable to retrieve a document from a location corresponding to the user-identified document link.

18. The computer readable storage medium of claim 16, wherein the user-identified document link is inoperative if it includes at least one misspelled term.

19. The computer readable storage medium of claim 16, wherein the user-identified document link is inoperative if it is incomplete.

20. A computer-implemented method, comprising:
at a server computer having one or more processors and memory storing instructions for execution by the one or more processors,
receiving a user-identified document link from a client computer, wherein the user-identified document link includes an identifier of the server computer;
determining that the user-identified document link is inoperative, and in response to determining that the user-identified document link is inoperative:
submitting the document link to a document link server;
receiving multiple information items from the document link server; and
returning to the client computer, for display by a browser application executed by the client computer, at least a subset of the information items, the returned information items including: (i) a plurality of user-editable query terms to be displayed in a search box distinct from a displayed address field of the browser application, wherein at least one of the query terms is different from the user-identified document link and is selected from the group comprising text extracted from the user-identified document link and a term based on text extracted from the user-identified document link, (ii) one or more candidate document links, wherein at least one candidate document link references a document that is available at a remote storage device, and (iii) a link to a cached document, which is a cached copy of a document distinct from documents corresponding to the one or more candidate document links, the cached copy comprising a cached copy of a document corresponding to the user-identified document link, wherein the link to the cached document is a link to a location remote from the client computer.

21. The method of claim 20, wherein after receiving the user-identified document link from the client computer, the server computer determines that the user-identified document link is inoperative.

22. The method of claim 21, wherein the user-identified document link is inoperative if the server computer is unable to retrieve a document from a location corresponding to the user-identified document link.

23. The method of claim 21, wherein the user-identified document link is inoperative if it includes at least one misspelled term.

24. The method of claim 21, wherein the user-identified document link is inoperative if it is incomplete.

25. A computer-implemented method, comprising:
   at a server computer having one or more processors and memory storing instructions for execution by the one or more processors,
      receiving a user-identified document link from a client computer;
      in response to a determination that the user-identified document link is inoperative:
         extracting a plurality of distinct query terms from the user-identified document link, wherein at least one of the query terms is different from the user-identified document link;
         searching a set of document links for one or more candidate document links in accordance with the user-identified document link, wherein at least one candidate document link references a document that is available at a storage device remote from the client computer; and
         returning to the client computer, for display by a browser application executed by the client computer, a set of information items comprising: (i) user-editable query terms comprising the plurality of distinct query terms for display in a search box distinct from a displayed address field of the browser application, (ii) the candidate document links, and (iii) a link to a cached document, which is a cached copy of a document distinct from documents corresponding to the one or more candidate document links, the cached copy comprising a cached copy of a document corresponding to the user-identified document link, wherein the link to the cached document is a link to a location remote from the client computer.

26. The method of claim 25, wherein after receiving the user-identified document link from the client computer, the server computer determines that the user-identified document link is inoperative.

27. The method of claim 26, wherein the user-identified document link is inoperative if the server computer is unable to retrieve a document from a location corresponding to the user-identified document link.

28. The method of claim 26, wherein the user-identified document link is inoperative if it includes at least one misspelled term.

29. The method of claim 26, wherein the user-identified document link is inoperative if it is incomplete.

* * * * *